US005798144A

United States Patent [19]

Varanasi et al.

[11] Patent Number: 5,798,144
[45] Date of Patent: Aug. 25, 1998

[54] METHOD FOR IMPARTING HYDROPHOBICITY TO A SURFACE OF A SUBSTRATE WITH LOW CONCENTRATION ORGANOFUNCTIONAL SILANES

[75] Inventors: P. Prabodh Varanasi, Racine; John F. Goelz, Milwaukee; Murthy S. Munagavalasa, Racine, all of Wis.

[73] Assignee: S. C. Johnson & Son, Inc., Racine, Wis.

[21] Appl. No.: 946,750

[22] Filed: Oct. 12, 1997

Related U.S. Application Data

[63] Continuation of Ser. No. 627,690, Apr. 2, 1996, abandoned.

[51] Int. Cl.⁶ .................. B05D 1/02; B05D 1/36; B05D 1/38; B05D 5/00
[52] U.S. Cl. .............. 427/384; 556/413; 106/2; 106/287.11; 427/402; 252/357
[58] Field of Search ................... 556/413, 401, 556/465, 466; 106/2, 287.11; 252/357; 510/466, 191, 192, 193; 427/384, 402

[56] References Cited

U.S. PATENT DOCUMENTS

| | | | |
|---|---|---|---|
| 4,005,028 | 1/1977 | Heckert et al. | 252/99 |
| 4,005,030 | 1/1977 | Heckert et al. | 252/140 |
| 4,428,930 | 1/1984 | Chang | 424/52 |
| 4,467,013 | 8/1984 | Baldwin | 428/289 |
| 4,576,728 | 3/1986 | Stoddart | 252/102 |
| 4,721,511 | 1/1988 | Kupits | 8/188 |
| 4,842,766 | 6/1989 | Blehm et al. | 252/309 |
| 4,915,260 | 4/1990 | Jones . | |
| 4,999,249 | 3/1991 | Deschler et al. | 428/447 |
| 5,073,195 | 12/1991 | Cuthbert et al. | 106/2 |
| 5,209,775 | 5/1993 | Bank et al. | 106/2 |
| 5,300,327 | 4/1994 | Stark-Kasley et al. | 427/387 |

FOREIGN PATENT DOCUMENTS 7051651  2/1995  Japan .

*Primary Examiner*—Erma Cameron

[57] ABSTRACT

A method is disclosed for imparting hydrophobicity to the surface of a substrate that is repeatedly treated with a solution containing a low level organofunctional silane. The method has particular application in toilet bowl dispensing systems, hard surface cleaners and for providing abrasion or scratch resistant coatings.

10 Claims, No Drawings

METHOD FOR IMPARTING HYDROPHOBICITY TO A SURFACE OF A SUBSTRATE WITH LOW CONCENTRATION ORGANOFUNCTIONAL SILANES

This application is a continuation of Ser. No. 08/627,690 filed Apr. 2, 1996 and now abandoned.

BACKGROUND OF THE INVENTION

1. Field of the Invention

This invention relates to a method for imparting hydrophobicity to a surface of a substrate by the repeated application of low concentration organofunctional silanes. The method may be practiced, for example, using hard surface cleaners, in dip coating operations, for providing abrasion resistance or with toilet bowl dispensing systems.

2. Related Background Art

It is well known to apply organofunctional silanes to surfaces to impart water repellency, to provide a protective barrier or to improve the soil release properties of the treated surfaces. For example, U.S. Pat. No. 4,005,028 and U.S. Pat. No. 4,005,030 describe various compositions containing an organosilane and a surfactant. The compositions are said to impart soil release benefits to metallic and vitreous surfaces when the organosilane is present in an amount from 0.2 to 20 ppm after dilution with water during usage.

Organofunctional silanes have (or form by hydrolysis) reactive silanol groups. The silanol group may then condense with a reactive site on a treated surface, e.g., such as the free hydroxyls on a glass surface. A silane that has condensed on the treated surface and which has a relatively hydrophobic moiety i.e., an organofunctional group, will increase the hydrophobicity of the surface to which it is attached. Such treated surfaces are known to have better soil release properties, inhibit soil deposition and even may be scratch or abrasion resistant.

Organofunctional silanes are a relatively expensive component of cleaning solutions. Thus, a method which provides the enhanced cleaning characteristics of organofunctional silane containing solutions but which reduces the concentration of silane employed would be commercially advantageous. An object of this invention is to provide a method of increasing the hydrophobicity of a treated surface by repeatedly applying a solution containing relatively low levels of an organofunctional silane to that surface.

SUMMARY OF THE INVENTION

This invention relates to a method for imparting hydrophobicity to a surface of a substrate by applying a solution having less than 0.2 ppm of a organofunctional silane to the surface and repeating the application an effective number of times to increase the hydrophobicity of the treated surface. Surprisingly, it has been discovered that the repeated application of very low levels of organofunctional silane containing solutions, preferably between about 0.001 ppm to 0.1 ppm, most preferably between about 0.01 ppm to 0.1 ppm, to the surface of a substrate results in a relatively (as opposed to continuous exposure) rapid increase in hydrophobicity of the treated surface. Thus, this method provides an advantageous manner of modifying the surface of a substrate so as to improve the cleaning properties of the surface, e.g., increased soil release or soil repulsion, with a relatively low level of organofunctional silane.

One preferred embodiment of the method of this invention comprises the steps of (a) applying a solution having less than 0.2 ppm, preferably 0.001 to 0.1 ppm, most preferably 0.01 ppm to 0.1 ppm, of an organofunctional silane to the surface of a substrate; (b) removing the solution from the surface by preferably wiping, drying or allowing the solution to evaporate; and (c) repeating steps (a) and (b) until the surface exhibits an increase in hydrophobicity. The step of applying includes, for example, spraying or dipping, or any other manner of introducing the solution to the surface of the substrate.

Yet another aspect of the invention is directed to a method for imparting hydrophobicity to a surface of a substrate immersed in water comprising the steps of applying an organofunctional silane containing solution to the water in an amount effective to provide about 0.001 ppm to 0.1 ppm, preferably about 0.01 ppm to 0.1 ppm, of said silane in the water and repeating the step of applying said organofunctional silane containing solution to the water an effective number of times to increase the hydrophobicity of the surface immersed in the water. This embodiment of the method of this invention is particularly applicable to toilet bowl dispensing systems.

DETAILED DESCRIPTION OF THE INVENTION

The method of this invention may be practiced with any solution containing an organofunctional silane capable of attaching to reactive sites on the surface of a substrate. Such substrates include, for example, glass, porcelain, ceramics, metals, glazed materials and the like.

The organofunctional silanes that are useful in the present invention include those represented by the formula

wherein A is hydroxy or a hydrolyzable group, B is an alkyl group of from 1 to 4 carbon atoms and D is a hydrocarbon group having 1 to 30 carbon atoms, a perfluoroalkyl group having 3 to 22 carbon atoms, phenyl, or a substituted-hydrocarbon having 1 to 30 carbon atoms and containing at least one oxygen or nitrogen group or salts of such substituted-hydrocarbon groups.

Organofunctional silanes that may be used in this invention are well known to those skilled in the art. For example, U.S. Pat. No. 5,411,585 to Richard W. Avery et al. the disclosure of which is incorporated by reference herein, describes certain organosilanes containing hydrolyzable groups, especially quaternary ammonium functional organosilanes, that can form clear solutions in aqueous media which are stable over extended periods of time by including a water soluble organic, non-silicon quaternary ammonium compound along with nonionic, amphoteric, sarcosine anionic or certain cationic surfactants.

Another useful organofunctional silane is disclosed by U.S. Pat. No. 5,550,184 to Robert A. Hallings. The disclosure of which is incorporated by reference herein. This publication describes a hydrolyzed silane obtained by emulsifying a hydrolyzable alkoxysilane represented by the formula:

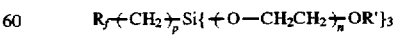

wherein $R_f$ is a perfluoroalkyl radical of 3 to 18 carbon atoms, each R' is independently an alkyl radical of 1 to 3 carbon atoms, p is 2 to 4 and n is 2 to 10, with an effective amount of an emulsifier of sufficiently high HLB value to simultaneously retain the hydrolyzable alkoxysilane compound in a substantially totally hydrolyzed state while inhibiting the self-condensation of the hydrolyzed alkoxysilane. These alkoxysilanes are believed to be hydrolyzed to hydroxysilanes represented by the formula:

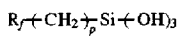

which do not substantially self-condense when the emulsifier is present.

A similar, but non-fluorinated, alkoxysilane aqueous emulsion that is useful in the present invention is TLF-8291, available from E. I. Du Pont de Nemours and Company, Wilmington, Del. TLF-8291 is believed to contain hydrolyzed $C_{18}$-alkyltrialkoxysilane (about 10% by weight of the emulsion) in combination with $C_{8-18}$ tetraalkylammonium chloride (about 30 to 40% by weight of the silane) in water.

Yet another useful organofunctional silane that may be employed in the method of this invention is represented by the formula:

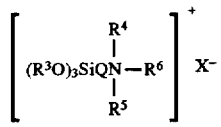

wherein $R^3$ is a hydrolyzable lower alkyl group having 1 to 6 carbon atoms, $R^4$, $R^5$ and $R^6$ are each independently alkyl groups having 1 to 24 carbon atoms, Q is an alkylene radical having 1 to 6 carbon atoms and X is a halogen. Particularly preferred hydrolyzable quaternary silanes include, without limitation, 3-(trimethoxysilyl) propyldimethyloctadecylammonium chloride (available as Dow Corning Q9-6346 Quaternary Silane or DC 5772 from Dow Corning Corp., Midland, Mich.) and 3-(trimethoxysilylpropyl) didecylmethylammonium chloride (available as Y-11724 Requat Antimicrobial Liquid from Sanitized, Inc., New Preston, Conn.).

The organofunctional silane is generally an aqueous solution. Preferably, the water is distilled or deionized to remove minerals and other contaminants. Optionally, from about 0.1 to 25% by weight of the total aqueous solution can be water soluble solvents such as butyl carbitol, dipropylene glycol monomethylether, propylene glycol, carbitol, methoxyproponal, glycerine, isopropanol, ethanol and the like.

Preferably, the organofunctional silane solutions employed in this invention contain surfactants. The surfactants may assist in the stabilization of the organofunctional silane solutions, such as disclosed in the contemporaneously filed copending applications Ser. Nos. 08/629,958 and 08/626,402 entitled, respectively, "Alkaline Cleaning Formulation Containing a Hydrolyzed Silane and Method of Applying the Same" and "Acidic Cleaning Formulation Containing A Surface Modification Agent and Method of Analyzing the Same," the disclosure of both of which are incorporated by reference as if fully set forth herein.

It is also preferable to include at least one surfactant in the organofunctional silane containing aqueous solution when the method of this invention is practiced in a toilet bowl tank dispensing system, such as an Automatic Vanish® Bottle commercially used by S. C. Johnson & Son, Inc., Racine, Wis. The Automatic Vanish® Bottle discharges an in-tank toilet bowl cleaner solution by a fixed quantity when an outermost cap of the bottle is raised up against gravity while the bottle is maintained in an up-side down position. An exemplary dispenser is disclosed in U.S. Pat. No. 4,915,260, the disclosure of which is incorporated herein as if fully set forth. When such an in-tank toilet bowl dispensing system is employed in the method of this invention it is preferable to include at least a low level of surfactant in the organofunctional silane containing solution to ensure that the solution is discharged from the system. It is believed that the preferred surfactant is one which causes an aqueous solution to foam, such as Neodol® 91-6, $[RO(CH_2CH_2O)_nNH$, wherein R is 9 to 11 carbon atoms and n is approximately 6] available from Shell Chemical Co., Houston, Tex. Generally, the level of surfactant may be approximately around the critical micelle concentration although any amount of surfactant which allows for the increase in hydrophobicity of the treated substrate is contemplated for use in the method of this invention.

The organofunctional silane containing solution may be applied by any means which will transfer the solution to the surface of the substrate. Generally, such means include spraying, pouring, dipping and the like. Preferably, the solution is applied by dipping or spraying using any conventional dip or spray system or spray container well known to those skilled in the art.

After the solution has been applied to the substrate, the solution is removed by, for example, wiping, drip drying, heating or simply allowing the solution to evaporate under ambient conditions. The period of time during which the organofunctional silane containing solution is contacted with the substrate is not believed to be critical. Generally, the applied solution is left in contact with the substrate prior to removal for at least about 10 seconds. After the solution has been removed from the substrate, the steps of applying and removing the organofunctional silane containing solution is repeated so that the substrate undergoes a plurality of treatments.

The number of times the organofunctional silane solution is applied to the substrate will vary depending on the silane concentration of the solution, the means of application and the desired hydrophobicity. In general, the number of applications will provide an increase in hydrophobicity which exhibits at least a 5 degree increase in advancing contact angle, preferably at least a 10 degree increase and most preferably at least a 20 degree increase compared to an advancing contact angle of the uncoated substrate. Typically, the hydrophobicity will increase with an increasing number of applications until a plateau is reached. The organofunctional silane concentration of the solution and the number of applications for a desired amount of surface modification can be readily ascertained without undue experimentation by one skilled in the art.

As noted previously, the organosilane containing solutions employed in the method of this invention have a concentration of less than 0.2 ppm organofunctional silane. Preferably, the organofunctional silane is present in an amount between about 0.001 ppm and 0.1 ppm, most preferably about 0.01 ppm to about 0.1 ppm.

Another embodiment of this invention is directed to a method for imparting hydrophobicity to the surface of a substrate immersed in water. This aspect of the invention comprises the steps of applying an organofunctional silane to water to achieve an organofunctional silane concentration of less than 0.2 ppm and repeating the application step a number of times until the substrate has a desired level of hydrophobicity.

Typically, this embodiment is practiced in a toilet bowl dispensing system. Such dispensing systems are well known to those skilled in the art. The average volume of water present in a toilet bowl and tank can be calculated. Using this calculation along with knowledge of the dispensing rate of the dispensing system, one skilled in the art can readily ascertain the concentration of organofunctional silane needed in the dispensing system to obtain an organofunctional silane concentration of less than 0.2 ppm in the water contained in a toilet tank and bowl. It is believed that the surface modification of ceramic or porcelain bowls by increasing the hydrophobicity improves the ease of cleaning and also inhibits soil and mineral deposition even when relatively low levels of organofunctional silanes are employed.

The Examples which follow are intended as an illustration of certain preferred embodiments of the invention and no limitation of the invention is implied.

EXAMPLE 1

An aqueous solution containing 0.1 ppm of an organofunctional silane, Dow Corning A9-6346 (3-(trimethoxysilyl) propyldimethyloctadecylammonium chloride), was prepared. The organofunctional silane containing solution was applied to a glazed ceramic tile (the ceramic tile were cleaned with Comet cleaner prior to use) by dipping the tile into the solution for 15 second intervals. After each dipping the tile was wiped dry with Kleenex® paper towels. The hydrophobicity of the treated tile was measured using a contact angle technique.

Contact Angle

Two angles, i.e., the advancing and receding contact angles were measured with a captive drop of deionized water placed on the coated tile using a goniometer and Drop® software, available from Professor Finn K. Hansen, Dept. of Chemistry, University of Oslo, Norway. A drop of deonized water was placed on the horizontal surface of the tile and observed in cross section through a telescope. The goniometer was used to measure the angle. The angle of vision was just slightly off horizontal so the edge of the drop and its reflected image were both visible. This allowed the tangent to be determined precisely at the point of contact between the drop and the surface.

The angle was advanced by adding liquid slowly from a syringe mounted above the drop. The needle was left in the drop after addition and the angle was measured immediately (within about 10 second to 15 seconds) after addition of the deionized water. The receding angle was measured by pulling small amounts of liquid back into the syringe. The greater the angle (measured in degrees), both advancing and receding, the greater the hydrophobicity of the tile.

The contact angle measurements for the ceramic tile treated with 0.1 ppm Dow Corning Q9-0346 are set forth in Table 1 below.

TABLE 1

| No. of Coats | Advancing Angle | | Retreating Angle | |
| --- | --- | --- | --- | --- |
| | Avg. | Std. Dev. | Avg. | Std. Dev. |
| 0 | — | — | ~0 | ~0 |
| 1 | 24.6 | 5.1 | ~0 | ~0 |
| 3 | 23.8 | — | — | — |
| 5 | 52.3 | 5.1 | 21.6 | 1.9 |
| 10 | 69.9 | 4.1 | 26.8 | 3.2 |
| 20 | 73.6 | 3.8 | 23.5 | 8.9 |
| 35 | 76.6 | 3.0 | 24.1 | 5.8 |
| 55 | 78.9 | 2.7 | 26.2 | 1.0 |
| 80 | 87.5/85.6 | 2.7/3.5 | 43.2/49.3 | 1.2/4.7 |
| 110 | 89.4 | 0.1 | 44.9 | 22.9 |
| 150 | 87.9 | 3.1 | 47.6 | 8.1 |
| 200 | 90.9 | 1.0 | 56.1 | 4.7 |
| 250 | 91.7 | 1.5 | 63.3 | 2.6 |

The results show a significant increase in hydrophobcity of the treated surface of the ceramic tile using multiple or repeated applications with a very low level organofunctional silane containing solution. The total time required to impart a certain level of hydrophobicity with the above described multiple dipping was significantly less than that required if the solution was left in contact continously with the substrate.

EXAMPLE 2

The same organofunctional silane containing solution used in Example 1, was applied to glazed ceramic tiles in a similar manner with the exception that the tile was cleaned with acetone prior to use. The results of the contact angle measurements are set forth in Table 2 below.

TABLE 2

| No. of Coats | Advancing Angle | Retreating Angle |
| --- | --- | --- |
| 0 | 38.1 | 0 |
| 1 | 49.3 | 19 |
| 2 | 62.3 | 25 |
| 3 | 73.5 | 26.1 |
| 5 | 83.9 | 23.6 |
| 10 | 82.8 | 18.7 |
| 20 | 82.6 | 18.5 |
| 35 | 87.3 | 30.2 |
| 55 | 89.6 | — |
| 80 | 88.6 | 38.9 |
| 110 | 90.8 | 54.8 |
| 150 | 90.9 | 61.1 |

There results also show the increased hydrophobicity of the treated ceramic tile using an aqueous solution containing only 0.1 ppm of a organofunctional silane with repeated application.

EXAMPLE 3

The organofuctional silane containing solution used in Example 1 was employed to coat microscopic slides (rinsed with deionized water and wiped with Kleenex® tissue). The slides were dipped in the solution for a specified period of time and then washed with deionized water and wiped with a Kleenex® tissue prior to measaurement of the contact angle. The duration of the contact time with the organofunctional silane containing solution and the contact angle measurements are set forth below in Table 3.

TABLE 3

| Time of contact (min.) | Avg. Advancing Angle | Avg. Retreating Angle |
| --- | --- | --- |
| 0.25 | 42.1 | 8.0 |
| 0.5 | 41.2 | 7.7 |
| 1 | 42.6 | 8.9 |
| 2 | 38.7 | 8.7 |
| 4 | 40.4 | 9.1 |
| 8 | 43.5 | 12.5 |
| 16 | 44.3 | 8.6 |
| 32 | 58.0 | 18 |
| 64 | 51.7 | 14.7 |
| 1050 | 77.4 | 36.8 |

These results show that although the hydrophobicity imparted to the substrate increases after a relatively long exposure (e.g., 1050 minutes), there was surprisingly little difference between an exposure time of 0.25 minutes and 16 minutes. This phenomena is highly advantageous for applications, such as with a hard surface cleaner, where the user only desires a short contact time before removal.

EXAMPLE 4

Several automatic toilet bowl tank dispensing systems were filled with an organofunctional silane containing solution that provided 0.1 ppm organofunctional silane and 0.05 ppm Neodol 91-6 in the toilet bowl water after the toilets were flushed. Ceramic tile coupons were first cleaned with Comet® using Teri Wipe® paper towels. Prior to placing the toilet bowl tank dispensing system in the toilet tanks, the toilets were flushed several times to rinse the ceramic coupons. The toilets were flushed simultaneously at two minute intervals. A coupon was removed from each bowl after 10, 20, 40, 60 and 100 flushes and the contact angels were measured. The results are set forth in Table 4 below.

TABLE 4

| No Flushes | Advancing Angle | | Retreating Angle | |
|---|---|---|---|---|
| | Avg. | Std. Dev. | Avg. | Std. Dev. |
| 10 | 32.5 | 4.8 | 13 | 4.6 |
| 20 | 38.3 | 4.3 | 14.1 | 2.6 |
| 40 | 37.5 | 5.8 | 12.2 | 2.6 |
| 60 | 67.0 | 7.2 | 36.1 | 6.2 |
| 100 | 62.7 | 5.8 | 28.7 | 6.6 |

These results illustrate that an automatic toilet bowl dispensing system using the method of this invention can impart significant hydrophobicity to the surface of the toilet bowl by the introduction of a very low level of organofunctional silane to the toilet water with each flush.

EXAMPLE 5

A similar experiment as shown in Example 4 was conducted, with the exception that the toilets were flushed at thirty minute internals. The results are set forth in Table 5 below.

TABLE 5

| No Flushes | Advancing Angle | | Retreating Angle | |
|---|---|---|---|---|
| | Avg. | Std. Dev. | Avg. | Std. Dev. |
| 5 | 17.3 | 3.9 | — | — |
| 10 | 19.0 | 1.6 | — | — |
| 20 | 16.6 | 2.1 | — | — |
| 40 | 34.9 | 2.8 | 9.5 | 0.6 |
| 60 | 58.7 | 2.2 | 28.0 | 3.1 |
| 100 | 79.0 | 7.1 | 54.7 | 1.9 |
| 160 | 69.0 | 6.5 | 25.2 | 6.0 |
| 190 | 83.1 | 7.7 | 43.2 | 15.3 |
| 310 | 72.0 | 7.9 | 38.4 | 0.5 |
| 310* | 78.5 | 0.7 | — | — |

*before rinsing with deionized water.

These results confirm the findings shown in Example 4 when a flush interval of 30 minutes is employed.

EXAMPLE 6

An organofunctional silane containing solution similar to Example 1 was prepared, with the exception that the Q9-6346 organofunctional silane was present in the solution at 0.01 ppm. The solution was tested in a similar manner as described in Example 1 and the results of those tests are set forth in Table 6 below.

TABLE 6

| No. of Coats | Advancing Angle Avg. (degrees) | Retreating Angle Avg. (degrees) |
|---|---|---|
| Bare surface | 11.0 | — |
| 10 coats | 42.9 | — |
| 30 coats | 68.9 | 24.4 |
| 100 coats | 77.9 | 32.2 |

These results show that a significant increase in hydrophobicity was achieved even when a solution containing 0.01 ppm organofunctional silane was repeatedly applied to the ceramic tile substrate.

Other variations and modifications of this invention will be obvious to those skilled in the art. This invention is not limited except as set forth in the following claims.

We claim:

1. A method for imparting hydrophobicity to a surface of a substrate comprising the steps of applying to said surface a solution having less than 0.2 ppm of an organofunctional silane, wherein said organofunctional silane is represented by the formula:

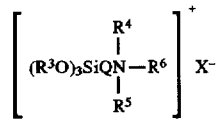

wherein $R^3$ is a hydrolyzable lower alkyl group having 1 to 6 carbon atoms, $R^4$, $R^5$ and $R^6$ are each independently alkyl groups having 1 to 24 atoms, Q is an alkylene radical having 1 to 6 carbon atoms and X is a halogen, and repeating the application step until an advancing contact angle of water on said substrate is at least 5 degrees greater than the advancing contact angle of water on said surface before any organofunctional silane is applied to said surface.

2. The method according to claim 1, wherein said organofunctional silane is present in said solution in an amount between about 0.001 ppm and 0.1 ppm.

3. A method according to claim 2, wherein said organofunctional silane is 3-(trimethoxysilyl) propyldimethyloctadecyl ammonium chloride or 3-(trimethoxysilylpropyl) didecylmethylammonium chloride.

4. The method according to claim 1, wherein said step of applying comprises spraying, pouring or dipping.

5. A method for imparting hydrophobicity to a surface of a substrate comprising the steps of (a) applying a solution having 0.001 ppm to 0.1 ppm of an organofunctional silane, wherein said organofunctional silane is represented by the formula:

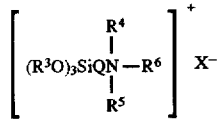

wherein $R^3$ is a hydrolyzable lower alkyl group having 1 to 6 carbon atoms, $R^4$, $R^5$ and $R^6$ are each independently alkyl groups having 1 to 24 atoms, Q is an alkylene radical having 1 to 6 carbon atoms and X is a halogen, to said surface;

(b) removing said solution from said surface; and (c) repeating steps (a) and (b) until an advancing contact angle of water on said substrate is at least 5 degrees greater than the advancing contact angle of water on said surface before any organofunctional silane is applied to said surface.

6. The method according to claim 5, wherein said step of applying comprises spraying, pouring or dipping.

7. The method according to claim 5, wherein said step of removing comprises wiping, drying or evaporating said solution.

8. A method according to claim 5, wherein said organofunctional silane is 3-(trimethoxysilyl) propyldimethyloctadecyl ammonium chloride or 3-(trimethoxysilylpropyl) didecylmethylammonium chloride.

9. A method for imparting hydrophobicity to a surface of a substrate immersed in water comprising the steps of applying an organofunctional silane, wherein said organofunctional silane is represented by the formula:

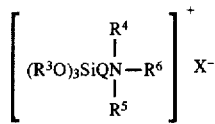

wherein $R^3$ is a hydrolyzable lower alkyl group having 1 to 6 carbon atoms, $R^4$, $R^5$ and $R^6$ are each independently alkyl groups having 1 to 24 atoms, Q is an alkylene radical having 1 to 6 carbon atoms and X is a halogen, to the water in an amount effective to provide from about 0.001 ppm to about 0.1 ppm of said organofunctional silane in the water and repeating said application step until an advancing contact angle of water on said surface is at least 5 degrees greater than the advancing contact angle of water on said surface before an organofunctional silane is applied to said surface.

10. A method according to claim 9, wherein said organofunctional silane is 3-(trimethoxysilyl) propyldimethyloctadecyl ammonium chloride or 3-(trimethoxysilylpropyl) didecylmethylammonium chloride.

* * * * *